US012612064B2

(12) United States Patent
Musabini

(10) Patent No.: US 12,612,064 B2
(45) Date of Patent: Apr. 28, 2026

(54) GUIDING A VEHICLE BASED ON GAZE TRACKING DATA

(71) Applicant: VALEO COMFORT AND DRIVING ASSISTANCE, Créteil (FR)

(72) Inventor: Antonyo Musabini, Bobingy (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 94 days.

(21) Appl. No.: 18/578,309

(22) PCT Filed: Jun. 30, 2022

(86) PCT No.: PCT/EP2022/068009
§ 371 (c)(1),
(2) Date: Jan. 11, 2024

(87) PCT Pub. No.: WO2023/285149
PCT Pub. Date: Jan. 19, 2023

(65) Prior Publication Data
US 2024/0300509 A1 Sep. 12, 2024

(30) Foreign Application Priority Data

Jul. 12, 2021 (DE) .......................... 102021117921.1

(51) Int. Cl.
*B60W 50/14* (2020.01)
*B60W 30/18* (2012.01)
(Continued)

(52) U.S. Cl.
CPC ...... *B60W 50/14* (2013.01); *B60W 30/18163* (2013.01); *B60W 50/10* (2013.01);
(Continued)

(58) Field of Classification Search
CPC ........... B60W 50/14; B60W 30/18163; B60W 50/10; B60W 2540/225; B60W 2556/40;
(Continued)

(56) References Cited

U.S. PATENT DOCUMENTS

2014/0078282 A1* 3/2014 Aoki ..................... G06V 40/161
348/78
2014/0204193 A1 7/2014 Zhang et al.
(Continued)

FOREIGN PATENT DOCUMENTS

DE 102020130749 A1 6/2021

OTHER PUBLICATIONS

International Search Report issued in corresponding German Patent Application No. DE 10 2021 117 921.1 issued Jan. 13, 2022 (6 pages).

(Continued)

*Primary Examiner* — Naomi J Small
(74) *Attorney, Agent, or Firm* — Osha Bergman Watanabe & Burton LLP

(57) ABSTRACT

The present invention relates to a method for guiding a vehicle at least in part automatically. The method includes generating gaze tracking data by tracking a gaze direction of a user of the vehicle for a predefined time interval and analyzing the gaze tracking date by a computer unit with respect to a lane change intention of the user. Depending on a result of the analysis, an at least partially automatic lane change maneuver is proposed to the user or the at least partially automatic lane changer maneuver is initiated by the computing unit.

19 Claims, 3 Drawing Sheets

(51) Int. Cl.
    *B60W 50/10*     (2012.01)
    *G06V 10/82*     (2022.01)
    *G06V 20/59*     (2022.01)
    *G06V 40/18*     (2022.01)

(52) U.S. Cl.
    CPC ............ *G06V 10/82* (2022.01); *G06V 20/597*
        (2022.01); *G06V 40/18* (2022.01); *B60W*
        *2420/403* (2013.01); *B60W 2540/20* (2013.01);
        *B60W 2540/225* (2020.02); *B60W 2556/40*
        (2020.02)

(58) Field of Classification Search
    CPC ........ B60W 2420/403; B60W 2540/20; G06V
        10/82; G06V 20/597; G06V 40/18
    USPC ...................................................... 340/425.5
    See application file for complete search history.

(56)             References Cited

U.S. PATENT DOCUMENTS

2016/0152184 A1*   6/2016  Ogawa ................. B60K 35/233
                                345/589

2017/0169612 A1*   6/2017  Cashen ................... G06T 19/20
2017/0327115 A1*  11/2017  Tokimasa ............... B60R 21/00
2018/0354517 A1   12/2018  Banno et al.
2019/0077308 A1    3/2019  Kashchenko
2020/0005060 A1    1/2020  Martin et al.
2020/0174560 A1*   6/2020  Park .......................... G06T 7/80
2020/0189595 A1    6/2020  Bertollini et al.
2020/0192093 A1*   6/2020  Lee .................... G02B 27/0103
2020/0282998 A1*   9/2020  Yashiro ................. B60W 50/14
2020/0356790 A1*  11/2020  Jaipuria ................. G06T 11/00
2021/0089048 A1*   3/2021  Tran ...................... B60R 25/257
2021/0097370 A1*   4/2021  Agnihotram .......... G01C 21/28
2025/0172666 A1*   5/2025  Koivisto ................ G06F 18/23

OTHER PUBLICATIONS

International Search Report issued in corresponding International Application No. PCT/EP2022/068009 mailed Nov. 7, 2022 (3 pages).
Written Opinion issued in corresponding International Application No. PCT/EP2022/068009 mailed Nov. 7, 2022 (6 pages).

* cited by examiner

GUIDING A VEHICLE BASED ON GAZE TRACKING DATA

The present invention is directed to a method for guiding a vehicle at least in part automatically, wherein gaze tracking data is generated by tracking a gaze direction of a user of the vehicle for a predefined time interval and the gaze tracking data is analyzed by a computing unit with respect to a lane change intention of the user. The invention further relates to an electronic vehicle guidance system and a computer program product.

Advanced driver assistance systems, ADAS, exist for various driving functions including lateral control and longitudinal control of the vehicle. In many cases, a user of the vehicle has to explicitly declare or indicate his or her intention to make use of a specific ADAS function. However, in an actual situation, where the ADAS could or should be used, the user may be busy with other driving tasks, may for other reasons not think of using the ADAS or may not even be aware that the respective ADAS is applicable in the current situation or is available at all.

Document US 2019/0077308 A1 describes a method for automatically activating turn indicators of a motor vehicle, wherein a change in a driver's gaze in a side mirror of the motor vehicle is identified and respective information is fed into a neural network, which may, after respective training, automatically activate the turn indicator of the vehicle depending on the behavior of the driver.

It is an object of the present invention to allow for an at least partially automatic guidance of a vehicle, which improves a comfort level for a user of the vehicle.

This object is achieved by the respective subject-matter of the independent claims. Further implementations and preferred embodiments are subject-matter of the dependent claims.

The invention is based on the idea to evaluate the gaze of the user and, depending on a result of the evaluation, propose an at least partially automatic lane change maneuver to the user or initiate such a maneuver.

According to an aspect of the invention, a method for guiding a vehicle at least in part automatically is provided. Gaze tracking data is generated by tracking a gaze direction of a user of the vehicle for a predefined time interval, in particular by using a gaze tracking sensor system of the vehicle. The gaze tracking data is analyzed by a computing unit, in particular of the vehicle, with respect to a lane change intention of the user. Depending on a result of the analysis, an at least partially automatic lane change maneuver is proposed to the user, in particular by the computing unit and/or a human machine interface of the vehicle, or the at least partially automatic lane change maneuver is initiated by the computing unit.

An electronic vehicle guidance system may be understood as an electronic system, configured to guide a vehicle in a fully automated or a fully autonomous manner and, in particular, without a manual intervention or control by a driver or user of the vehicle being necessary. The vehicle carries out all required functions, such as steering maneuvers, deceleration maneuvers and/or acceleration maneuvers as well as monitoring and recording the road traffic and corresponding reactions automatically. In particular, the electronic vehicle guidance system may implement a fully automatic or fully autonomous driving mode according to level 5 of the SAE J3016 classification. An electronic vehicle guidance system may also be implemented as an advanced driver assistance system, ADAS, assisting a driver for partially automatic or partially autonomous driving. In particular, the electronic vehicle guidance system may implement a partly automatic or partly autonomous driving mode according to levels 1 to 4 of the SAE J3016 classification. Here and in the following, SAE J3016 refers to the respective standard dated June 2018.

Guiding the vehicle at least in part automatically may therefore comprise guiding the vehicle according to a fully automatic or fully autonomous driving mode according to level 5 of the SAE J3016 classification. Guiding the vehicle at least in part automatically may also comprise guiding the vehicle according to a partly automatic or partly autonomous driving mode according to levels 1 to 4 of the SAE J3016 classification.

The gaze tracking sensor system may for example comprise an infrared sensor or an infrared camera, wherein a potential position of the head and/or eyes of the driver are in a field of view of the sensor or camera. Infrared radiation emitted by an infrared emitter of the gaze tracking sensor system is partially reflected by the eyes of the driver depending on the gaze direction. In this way, the gaze tracking sensor system may determine the gaze direction and consequently generate the gaze tracking data. However, also alternative approaches for gaze tracking may be applicable.

The gaze direction may for example be understood as a straight line defined by a gaze direction vector. In order to track the gaze direction, it may be determined repeatedly during the time interval at a predefined frequency, for example in the order of several tenths of milliseconds, for example around 50 ms. The gaze directions or respective data, for example a virtual intersection point of the gaze direction with a predefined plane, may be stored or buffered during the time interval for analyzing the gaze tracking data. In particular, the analysis of the gaze tracking data does not necessarily start after completion of the time interval. In particular, the analysis of the gaze tracking data may be carried out at least in part during the time interval. The time interval may also be considered as a floating time interval, and the gaze tracking data may be analyzed in a continuous manner.

The at least partially automatic lane change maneuver is proposed or initiated depending on a result of the analysis. In particular, the lane change maneuver is proposed or initiated, only if the lane change intention is identified or determined by means of the analysis, in particular with a probability, which is higher than a predefined minimum probability. In other words, determining the lane change intention of the user is a necessary condition for proposing or initiating the lane change maneuver. However, determining the lane change intention of the user is not necessarily a sufficient condition, too. In other words, further conditions may apply, which may for example comprise a safety related condition.

Initiating the at least partially automatic lane change maneuver may comprise initiating the maneuver without awaiting a further confirmation or action of the user. On the other hand, proposing the at least partially automatic lane change maneuver may be understood as a request or invitation to the user to initiate the maneuver or confirm the initiation of the maneuver.

By means of the method according to the invention, the user does not necessarily have to be aware that the at least partially automatic lane change maneuver and the respective function of the vehicle is available in general or in the particular current situation. Nevertheless, the at least partially automatic lane change maneuver may be initiated or proposed depending on the tracked gaze direction of the user. In this way, the amount of necessary user interactions may be reduced, which improves a level of comfort for the user, in particular in implementations, where the lane change maneuver is automatically initiated depending on the result of the analysis. In implementations, where the lane change maneuver is proposed to the user depending on the result of the analysis of the gaze tracking data, the probability that the user will initiate the at least partially automatic lane change maneuver in appropriate situation is increased. In this way, the amount of driving tasks being carried out manually by the user may also be reduced, also in this case improving the level of comfort for the user.

According to several implementations of the method, the at least partially automatic lane change maneuver is proposed to the user depending on the result of the analysis, and a lane change intention action of the user is detected in response to the proposal. The at least partially automatic lane change maneuver is initiated by the computing unit in response to the detected lane change input action.

In other words, the user may directly cause the computing unit to initiate the lane change maneuver in response to the proposal. The lane change input action of the user may for example include an activation of a soft key or hard key, a button or switch or, for example, an input device for activating a direction indicator, such as a lever for activating the direction indicator. The lane change input action of the user may also contain a predefined steering action of a predefined minimum intensity and/or an acceleration input of at least a minimum intensity.

For example, after the detection of the lane change input action, the lateral and optionally the longitudinal control of the vehicle may be carried out fully automatically by an electronic vehicle guidance system of the vehicle, at least for a predefined time period and/or until the maneuver is interrupted by the user or the electronic vehicle guidance system or for another reason.

According to several implementations, the at least partially automatic lane change maneuver is proposed to the user depending on the result of the analysis and a confirmation of the user is detected in response to the proposal. A driver assistance function for lane changing is activated in response to the confirmation.

The confirmation may for example be detected by means of a sensor system of another input device of the vehicle or by means of human machine interface of the vehicle. For example, the user may confirm the proposal by saying a specific or predefined phrase or by performing a gesture, such as nodding with the head or the like.

According to several implementations, a lane change input action of the user is detected while the driver assistance function is activated. The at least partially automatic lane change maneuver is initiated by the computing unit in response to the detected lane change input action.

According to several implementations, a manual actuation of a direction indicator by the user is detected as the lane change input action.

In other words, in implementations where the confirmation of the user is not detected, the user may actuate the direction indicator in response to the proposal of the at least partially automatic lane change maneuver. In other implementations, two actions of the user are involved. First, the proposal is confirmed and the confirmation is detected in response to the proposal. Second, after the driver assistance function has been activated, the user may actuate the direction indicator to actually initiate the partially automatic lane change maneuver.

According to several implementations, the analysis of the gaze tracking data comprises determining an intersection point of the gaze direction with a virtual plane, determining a map representing a distribution of the position of the intersection point on the virtual plane during the time interval and analyzing the map with respect to the lane change intention of the user.

In particular, the map may be analyzed to recognize specific characteristic patterns indicating the lane change intention of the user. Therein, the analysis or the characteristic patterns may partially be user dependent and may be learned beforehand.

The map may be understood as a representation, in particular an image representation, of the intersection points in two dimensions, in particular on the virtual plane. The map may for example have the form of a matrix with entries, wherein values of the entries depend on the duration or likelihood of the gaze direction having the corresponding intersection point with the virtual plane during the time interval. In other words, the map represents a local distribution of the gaze intensity.

The map may for example be visually represented as a two-dimensional heat map or color-shaded map or grey shaded map. In other words, the map may be represented as a two-dimensional image. The virtual plane may be understood as a geometric construction of a plane surface of predefined size. The virtual plane may also be denoted as virtual wall or imaginary surface. In particular, the virtual plane is virtually located at a predefined distance from the gaze tracking sensor system or a potential reference point for the user's head or eyes.

According to several implementations, a position and orientation of the virtual plane is fixed to a vehicle coordinate system of the vehicle or a sensor coordinate system of the gaze tracking sensor system. In particular, the orientation and position of the virtual plane with respect to the gaze tracking sensor system or the vehicle does not change when the gaze direction of the user changes.

For example, the virtual plane may be positioned parallel to a parallel axis of the vehicle coordinate system or the sensor coordinate system and may be positioned with a fixed angle or predefined angle with respect to a normal axis of the vehicle coordinate system or the sensor coordinate system. The angle may for example be approximately zero degrees, such that the virtual plane is oriented perpendicular to a longitudinal axis of the vehicle coordinate system or the sensor coordinate system. The virtual plane may for example be positioned at a predefined distance from an origin of the vehicle coordinate system or the sensor coordinate system in a longitudinal direction.

By means of such implementations, the gaze dynamics is directly analyzed in order to identify the lane change intention of the user. In particular, typical or characteristic points in the environment, such as a rear mirrors or side mirrors, are expected to be highlighted in the map and therefore allow for identifying the lane change intention. Since an image-based representation of the gaze dynamics is used in form of the map, the lane change intention of the user may be determined in a particularly reliable way, for example, compared to a mere analysis of the gaze direction. Furthermore, by the image-based representation, an algorithm for analyzing the map to determine the lane change intention of the user may require less data for training and/or may generate more precise results.

By analyzing the intersection point of the gaze direction with the virtual plane, the movement of the eyes of the users may be considered to be amplified by the distance between the eyes and the virtual plane. Therefore, more precise results may be achieved, for example, compared to a mere tracking of the pupils of the user.

According to several implementations, the analysis of the map comprises applying a classification algorithm to the map and identifying the lane change intention of the user depending on a result of the classification algorithm.

In other words, it is determined depending on the result of the classification algorithm or as a result of the classification algorithm whether or not the lane change intention of the user is present.

The classification algorithm may be implemented as a trained, in particular machine trained, classification algorithm, for example a support vector machine or an artificial neural network, for example a convolutional neural network, CNN.

The classification algorithm may for example use a binary classification to classify the map into one of two classes, one class corresponding to the positive identification of the lane change intention and one class corresponding to the negative identification of the lane change intention or, in other words, for cases where no lane change intention is found.

According to several implementations, the computing unit is used to extract a predefined set of one or more characteristic features from the map and to apply the classification algorithm to the set of characteristic features.

The characteristic features may for example include statistical properties of the map or the distribution, such as a standard deviation or a maximum value of the distribution in a given direction on the virtual plane and so forth.

The classification algorithm may also comprise the transformation of the predefined set of characteristic features into a suitable form for being classified by the classification algorithm.

According to several implementations, the analysis of the map comprises determining one or more regions on the virtual plane, wherein all entries of the map corresponding to the one or more regions have respective values that are equal to or greater than a predefined threshold value and identifying the lane change intention of the user based on the one or more regions.

The characteristic features may for example comprise one or more geometric features of the one or more regions and/or one or more features concerning the shape of the one or more regions. For example, an area or size in a predefined direction on the virtual plane may be used as such a feature.

According to several implementations, the computing unit is used to determine an image moment and/or a Hu moment based on the map. The computing unit is used to identify the lane change intention based on the image moment and/or based on the Hu moment. The image moment and/or the Hu moment may be considered as features of the predefined set of characteristic features.

According to several implementations, the analysis of the gaze tracking data comprise generating input data depending on the gaze tracking data and applying a trained recurrent neural network, RNN, to the input data and identifying the lane change intention of the user depending on an output of the RNN, in particular in response to the application of the RNN to the input data.

Recurrent neural networks, RNNs, in particular long short-term memory networks, LSTMs, have the advantage that they may take into account temporal dynamic behavior of the input data. Therefore, RNNs and in particular LSTMs, are particularly suitable for identifying the lane change intention from the gaze tracking data, since the lane change intention typically expresses itself in the form of characteristic dynamic behavior of the gaze.

In particular, the analysis of the input data by the RNN may, in several implementations, be combined with information regarding a frequency of how often the user checks a mirror, for example a side mirror or rear mirror of the vehicle, in order to determine the presence or absence of the lane change intention. In particular, the implementations, wherein the map of the distribution of the intersection point on the virtual plane is analyzed may be combined with implementations, where the RNN is used. This may allow for a particularly reliable identification of the lane change intention.

According to several implementations, environmental sensor data representing an environment of the vehicle is generated, in particular by an environmental sensor system of the vehicle. A safety level for lane changing is determined by a computing unit depending on the environmental sensor data, and the at least partially automatic lane change maneuver is proposed to the user depending on the safety level or the at least partially automatic lane change maneuver is initiated depending on the safety level.

In particular, the safety level may be compared to a predefined minimum safety level and the at least partially automatic lane change maneuver may be proposed or initiated only if the safety level is found to be equal to or greater than the predefined minimum safety level.

For determining the safety level, the computing unit may for example apply an image processing algorithm and/or a computer vision algorithm, such as object detection, object tracking or semantic segmentation, in order to determine whether it is safe and possible for the vehicle to change the lane accordingly. Based on the result of the evaluation, the safety level is determined. In this way, the safety of the at least partially automatic guiding of the vehicle is increased.

According to another aspect of the invention, an electronic vehicle guidance system for a vehicle is provided. The electronic vehicle guidance system comprises gaze tracking sensor system, which is configured to track a gaze direction of a user of the vehicle for a predefined time interval. The electronic vehicle guidance system comprises a computing unit, which is configured to analyze the gaze tracking data with respect to a lane change intention of the user. The computing unit is configured to, depending on a result of the analysis, propose an at least partially automatic lane change maneuver to the user or automatically initiate the at least partially automatic lane change maneuver.

For example, the electronic vehicle guidance system may comprise a human machine interface, such as a display device, a loudspeaker, a visual signaling device and/or a haptic output device. The computing unit may then, for example, generate a control signal for controlling the human machine interface depending on the result of the analysis in order to propose the lane change maneuver to the user. The human machine interface may then, depending on the control signal, output a corresponding information or a request signal to the user.

In other implementations, the computing unit is configured to generate control signals for controlling one or more actuators of the vehicle or of the electronic vehicle guidance system for initiating the at least partially automatic lane change maneuver.

According to several implementations of the electronic vehicle guidance system, it comprises an environmental sensor system for the vehicle, which is configured to generate environmental sensor data representing an environment of the vehicle. The computing unit is configured to determine a safety level for lane changing depending on the environmental sensor data. The computing unit is configured to propose the at least partially automatic lane change maneuver to the user depending on the safety level or to initiate the at least partially automatic lane change maneuver depending on the safety level.

Further implementations of the electronic vehicle guidance system follow directly from the various implementations of the method according to the invention and vice versa. In particular, an electronic vehicle guidance system according to the invention is configured to carry out a method according to the invention or carries out such a method.

According to a further aspect of the invention, a motor vehicle comprising an electronic vehicle guidance system according to the invention is provided.

According to another aspect of the invention, a computer program comprising instructions is provided. When the instructions or the computer program, respectively, are executed by an electronic vehicle guidance system according to the invention, in particular by the computing unit of the electronic vehicle guidance system, the instructions cause the electronic vehicle guidance system to carry out a method according to the invention.

According to a further aspect of the invention, a computer-readable storage medium storing a computer program according to the invention is provided.

The computer program as well as the computer-readable storage medium may be denoted as respective computer program products comprising the instructions.

Further features of the invention are apparent from the claims, the figures and the figure description. The features and combinations of features mentioned above in the description as well as the features and combinations of features mentioned below in the description of figures and/or shown in the figures may be comprised by the invention not only in the respective combination stated, but also in other combinations. In particular, embodiments and combinations of features, which do not have all the features of an originally formulated claim, are also comprised by the invention. Moreover, embodiments and combinations of features which go beyond or deviate from the combinations of features set forth in the recitations of the claims are comprised by the invention.

IN THE FIGURES

FIG. 1 shows schematically a vehicle 1, which comprises an exemplary implementation of an electronic vehicle guidance system 2 according to the invention.

Figure 1:
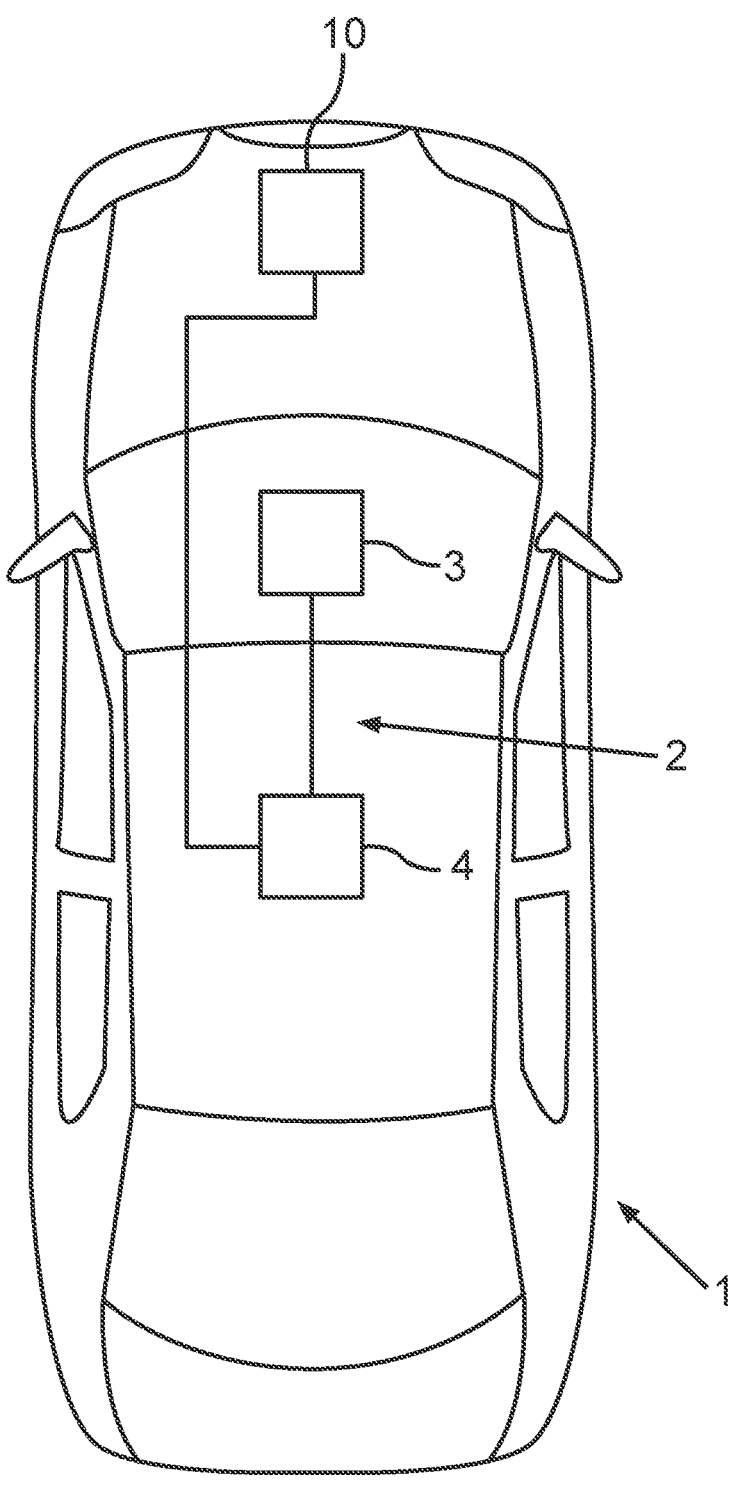
FIG. 1 shows schematically a vehicle with an exemplary implementation of an electronic vehicle guidance system according to the invention.

The electronic vehicle guidance system 2 comprises a gaze tracking sensor system 3, configured to determine a gaze direction 6 of a user 5 (see FIG. 3) of the vehicle 1. Furthermore, the electronic vehicle guidance system 2 comprises a computing unit 4. The electronic vehicle guidance system 2 is configured to carry out a method for guiding the vehicle 1 at least in part automatically according to the invention. Optionally, the electronic vehicle guidance system 2 may comprise an environmental sensor system 10, such as a camera system, a lidar system, a radar system and/or an ultrasonic sensor system.

The gaze tracking sensor system 3, which may for example comprise an infrared camera, tracks the gaze direction 6 of the user 5 for a predefined time interval and generates respective gaze tracking data. The gaze tracking data is then analyzed by the computing unit 4. If the computing unit 4 positively identifies a lane change intention of the user 5 based on the analysis of the gaze tracking data, the computing unit 4 may propose an at least partially automatic lane change maneuver to the user 5. In alternative implementations, the computing unit 4 may initiate the at least partially automatic lane change maneuver in case it has identified the lane change intention of the user 5. Therein, further conditions may apply for initiating or proposing the lane change maneuver, such as safety related conditions.

The function of the electronic vehicle guidance system 2 according to the invention will be explained in more detail in the following with respect to exemplary implementations of the method for guiding a vehicle at least in part automatically according to the invention and, in particular, with respect to FIG. 2 to FIG. 4.

Figure 2:
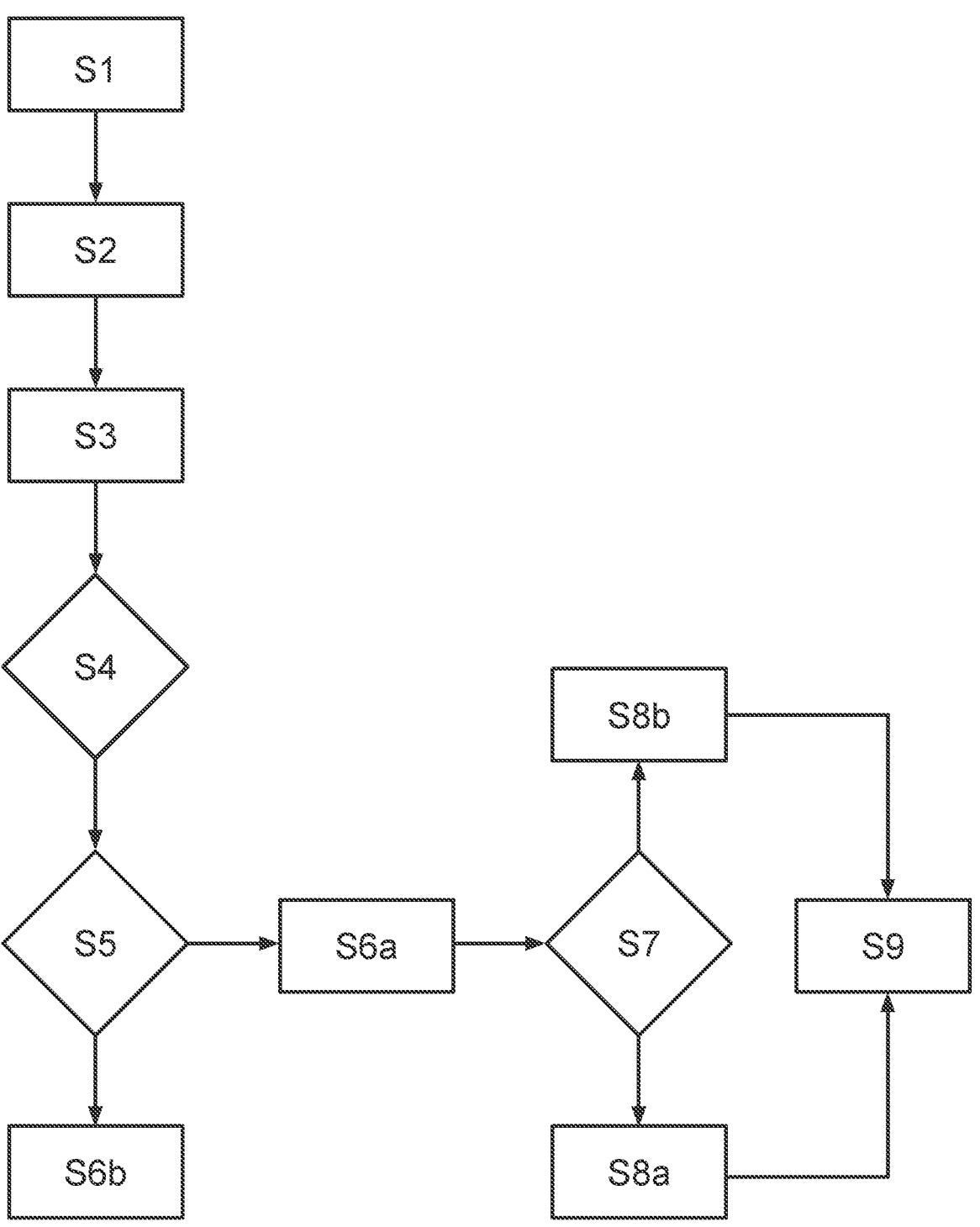
FIG. 2 shows a flow diagram of an exemplary implementation of a method according to the invention.

FIG. 2 shows a flow diagram of an exemplary implementation of a method according to the invention.

Step S1 represents the start of the method. In optional step S2 a user profile of the user 5 may be loaded by the computing unit 4. The user profile may for example store information regarding the identity of the user 5 and, for example, information regarding previous behavior of the user 5, in particular, while the method was carried out previously. For example, the user profile may comprise information, which allow the computing unit 4 to identify the lane change intention from the gaze direction 6 of the user 5 and the dynamic change of the gaze direction 6.

In step S3, the gaze direction 6 and its change is tracked for a predefined time interval, for example for 1 to 10 seconds, in particular for about 5 seconds. The computing unit 4 applies a classification algorithm, including for example including an LSTM, to the gaze tracking data collected during the time interval. The classification may be carried out continuously or repeatedly, for example every second.

In step S4, depending on the result of the classification algorithm, the computing unit 4 determines whether the gaze tracking data represent a pre-lane changing pattern or not. In other words, the computing unit 4 determines, whether the lane change intention of the user 5 is represented by the gaze tracking data or not. If the lane change intention is not identified, the method proceeds with step S3.

On the other hand, if the lane change intention is identified, a safety level for the lane change is optionally determined in step S5. To this end, the environmental sensor system 10 may generate environmental sensor data representing the environment of the vehicle 1, and the computing unit 4 may evaluate the environmental sensor data to determine whether a lane change is possible in a safe manner, for example depending on other road users in the environment, lane markings, traffic signs etcetera. If it is determined in step S5 that the safety level is below a predefined minimum safety level, the computing unit may initiate in step S6*b* a warning to the user 5. For example, the computing unit 4 may control a human machine interface to output a visual, haptic and/or acoustic signal to warn the user 5 that at present it is not safe enough to initiate a lane change. On the other hand, in case the safety level is determined to be equal to or greater than the minimum safety level, the lane change maneuver may be proposed to the user 5 in step S6a, for example via the human machine interface.

It is determined in step S7 whether the user 5 confirms the proposal, for example by detecting a respective confirmation action, such as actuating a button or saying a specific phrase. If this is the case, the computing unit 4 controls actuators (not shown) of the vehicle 1 in step S8a in order to carry out the lane change maneuver. On the other hand, if the user does not confirm the proposal or denies the proposal, the user profile may for example be optionally updated in step S8b in order to improve the prediction for further iterations. The method ends with step S9.

The classificator used for determining whether the gaze tracking data indicates the lane change intention or not may for example be based on an LSTM. Alternatively or in addition, the classification algorithm may generate a map 9 (see FIG. 4), which represents a distribution of the gaze direction 6 of the user 5 during the tracked time interval.

Figure 3:
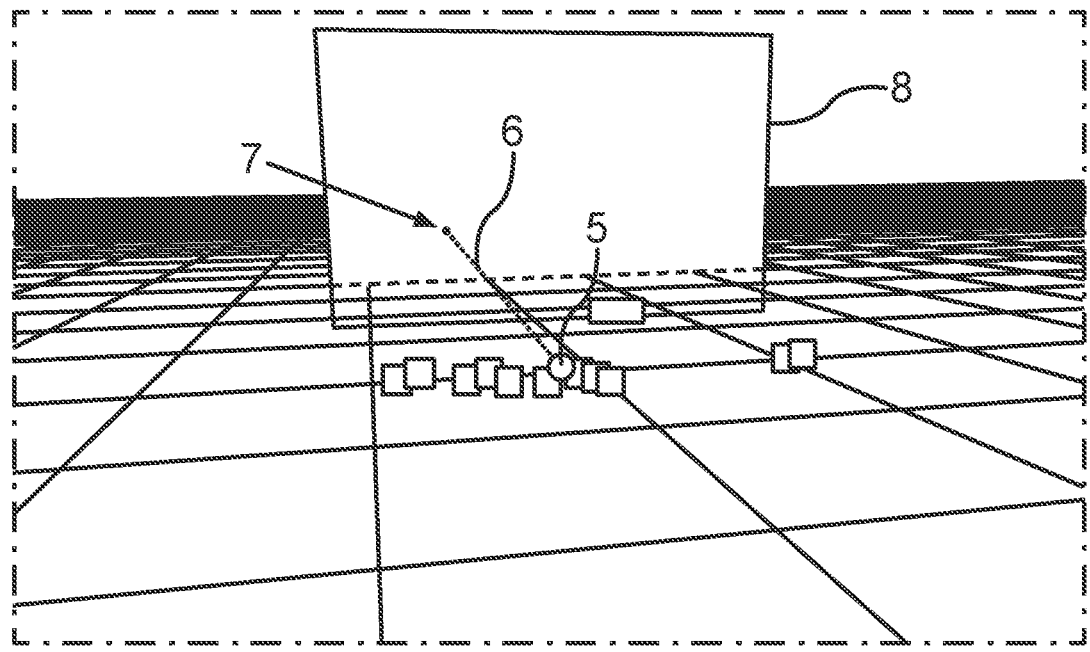
FIG. 3 shows schematically a virtual plane for use in exemplary implementations of a method according to the invention.
Figure 4:
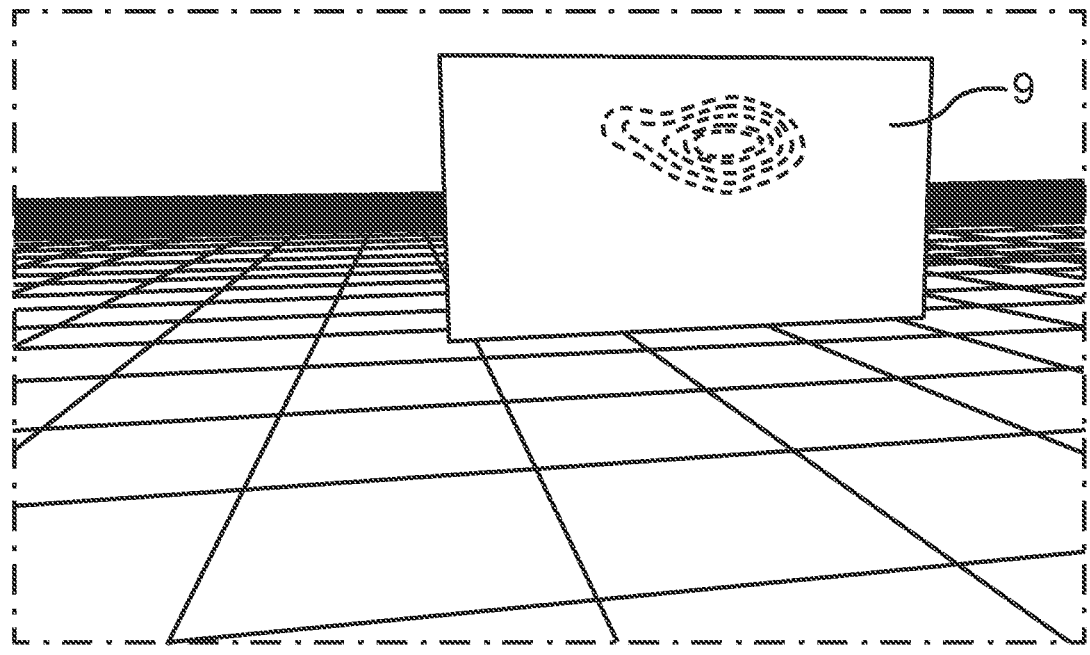
FIG. 4 shows schematically an example of a map for use in exemplary implementations of a method according to the invention.

As depicted schematically in FIG. 3, the computing unit 4 tracks an intersection point 7 of the gaze direction 6 of the user 5 with a virtual plane 8 located in front of the user 5 during the time interval. The coordinates of the intersection point 7 on the virtual plane 8 may for example be stored on a storage element of the computing unit 4. The computing unit 4 may then generate the map 9 based on the tracked intersection point 7. To this end, the computing unit 4 may determine a distribution of the gaze direction 6 or the intersection point 7, respectively, during the time interval. The result is the map 9, which may be considered as a heat map as depicted schematically in FIG. 4. In particular, the map 9 may have different colors or different grey values for different values of the densities of intersection points 7 on the virtual plane 8 during the time interval.

The computing unit 4 may extract a predefined set of characteristic features from the map 9 and apply a further classification algorithm to the set of characteristic features or may apply the further classification algorithm directly to the map 9 in order to determine or identify the lane change intention.

This may be achieved, for example, by comparing statistical or geometrical characteristics of the map, such as area and standard deviation of geometric features in the map 9. In this way, the further classification algorithm may determine whether there is a lane change intention or not.

As described, in particular with respect to the figures, the invention may increase the overall level of automation in lane changing scenarios. In particular, users may be encouraged in corresponding suitable situations to initiate the automatic lane change maneuver or activate a respective ADAS. In other words, barriers between new technologies and end users may be overcome in this way. It may be avoided that a user forgets to use a function for driver assistance in suitable situations or the user may be made aware of that function.

In some implementations, the variations of eye gaze directions on a virtual surface are used to create respective heat maps. It has been found that such heat maps follow specific shapes in case the user intends to change lanes. In other implementations, an LSTM or another RNN-based artificial intelligence model may be provided with the gaze tracking data and, optionally, the result may be combined with the frequency of mirror checking, which may for example be determined based on the heat map.

The invention claimed is:

1. A method for guiding a vehicle at least in part automatically, the method comprising:
generating gaze tracking data by tracking a gaze direction of a user of the vehicle for a predefined time interval;
analyzing the gaze tracking data by a computing unit with respect to a lane change intention of the user;
wherein the analysis of the gaze tracking data comprises:
determining an intersection point of the gaze direction with a virtual plane,
determining a map representing a distribution of the position of the intersection point during the time interval, and
analyzing the map with respect to the lane change intention of the user and based on previously identified patterns of the user; and
depending on a result of the analysis, proposing an at least partially automatic lane change maneuver to the user or initiating the at least partially automatic lane change maneuver by the computing unit.

2. The method according to claim 1, further comprising:
proposing the at least partially automatic lane change maneuver to the user depending on the result of the analysis;
detecting a lane change input action of the user in response to the proposal; and
initiating the at least partially automatic lane change maneuver by the computing unit in response to the detected lane change input action.

3. The method according to claim 1, further comprising:
proposing the at least partially automatic lane change maneuver to the user depending on the result of the analysis;
detecting a confirmation of the user in response to the proposal;
activating a driver assistance function for lane changing in response to the confirmation.

4. The method according to claim 3, further comprising:
detecting a lane change input action of the user while the driver assistance function is activated; and
initiating the at least partially automatic lane change maneuver by the computing unit in response to the detected lane change input action.

5. The method according to claim 2, further comprising:
detecting a manual actuation of a direction indicator by the user as the lane change input action.

6. The method according to claim 3, wherein the analysis of the map comprises:
applying a classification algorithm to the map; and
identifying the lane change intention of the user depending on a result of the classification algorithm.

7. The method according to claim 1, wherein the analysis of the map comprises:
determining one or more regions on the virtual plane,
wherein all entries of the map corresponding to the one or more regions have respective values that are equal to or greater than a predefined threshold value; and
identifying the lane change intention of the user based on the one or more regions.

8. The method according to claim 1, wherein the analysis of the gaze tracking data comprises:
generating input data depending on the gaze tracking data;
applying a trained recurrent neural network to the input data; and
identifying the lane change intention of the user depending on an output of the recurrent neural network.

9. The method according to claim 1, wherein the analysis of the gaze tracking data comprises:

generating input data depending on the gaze tracking data;

applying a trained recurrent neural network to the input data; and identifying the lane change intention of the user depending on an output of the recurrent neural network and depending on a result of the analysis of the map.

10. The method according to claim 8, wherein the recurrent neural network comprises a long short-term memory network.

11. The method according to claim 1, further comprising:

generating environmental sensor data representing an environment of the vehicle;

determining a safety level for lane changing by the computing unit depending on the environmental sensor data; and proposing the at least partially automatic lane change maneuver to the user depending on the safety level, or initiating the at least partially automatic lane change maneuver depending on the safety level.

12. A non-transitory computer readable medium comprising instructions for causing a processor to perform the method of claim 1.

13. The method of claim 1, wherein initiating the at least partially automatic lane change maneuver comprises changing a steering direction by a predefined steering action of a predefined minimum intensity.

14. The method of claim 1, wherein the previously identified patterns of the user are provided by a user profile stored in a memory of the computing unit.

15. The method of claim 6, wherein the analysis of the map comprises:

extracting a predefined set of characteristic features from the map, wherein the predefined set of characteristic features comprises a statistical property of the map, and applying the classification algorithm to the set of characteristic features.

16. The method of claim 7, wherein values of the entries depend on the duration or likelihood of the gaze direction intersecting with the virtual plane during the time interval, thereby representing a local distribution of gaze intensity.

17. The method of claim 8, further comprising applying the recurrent neural network to analyze a frequency of how often the user checks a mirror to determine the lane change intention.

18. An electronic vehicle guidance system for a vehicle, the guidance system comprising:

a gaze tracking sensor system, which is configured to track a gaze direction of a user of the vehicle for a predefined time interval; and a computing unit, which is configured to analyze the gaze tracking data with respect to a lane change intention of the user;

wherein the analyzing the gaze tracking data comprises:

determining an intersection point of the gaze direction with a virtual plane, determining a map representing a distribution of the position of the intersection point during the time interval, and analyzing the map with respect to the lane change intention of the user and based on previously identified patterns of the user; and wherein the computing unit is configured to, depending on a result of the analysis, propose an at least partially automatic lane change maneuver to the user or initiate the least partially automatic lane change maneuver.

19. The electronic vehicle guidance system according to claim 18, wherein the electronic vehicle guidance system comprises an environmental sensor system, which is configured to generate environmental sensor data representing an environment of the vehicle;

wherein the computing unit is configured to determine a safety level for lane changing depending on the environmental sensor data; and wherein the computing unit is configured to propose the at least partially automatic lane change maneuver to the user depending on the safety level or to initiate the at least partially automatic lane change maneuver depending on the safety level.

\* \* \* \* \*